United States Patent [19]

Lane et al.

[11] Patent Number: 5,560,883
[45] Date of Patent: Oct. 1, 1996

[54] METHOD FOR FORMING A LAYER OF SYNTHETIC CORROSION PRODUCTS ON TUBING SURFACES

[75] Inventors: Michael H. Lane; Eugene J. M. Salamon, both of Clifton Park, N.Y.

[73] Assignee: The United States of America as represented by the United States Department of Energy, Washington, D.C.

[21] Appl. No.: 473,461

[22] Filed: Jun. 7, 1995

[51] Int. Cl.$^6$ .......................... B29C 43/10; B29C 43/20; C04B 35/00
[52] U.S. Cl. .......................... 264/266; 264/60; 264/269; 264/275; 264/317; 264/345
[58] Field of Search .................. 264/269, 317, 264/230, 60, 62, 266, 275, 279, 320, 345

[56] References Cited

U.S. PATENT DOCUMENTS

| | | |
|---|---|---|
| 2,724,672 | 11/1955 | Rubin . |
| 2,771,655 | 11/1956 | Nervi . |
| 2,794,481 | 6/1957 | Anderson ............... 156/194 X |
| 3,107,158 | 11/1963 | Ahlberg . |
| 3,382,121 | 5/1968 | Sherlock . |
| 3,429,962 | 2/1969 | Krystyniak ............ 264/317 X |
| 3,573,021 | 3/1971 | Smith ..................... 264/60 |
| 4,040,163 | 8/1977 | Tronsberg ............. 264/317 X |
| 4,363,832 | 12/1982 | Odawara ................. 264/60 X |
| 4,368,217 | 1/1983 | Tournut . |
| 4,394,202 | 7/1983 | Thomas et al. ......... 264/230 X |
| 4,743,329 | 5/1988 | Hata . |
| 5,516,388 | 5/1996 | Moran et al. ........... 264/60 X |

Primary Examiner—Karen Aftergut
Attorney, Agent, or Firm—Virginia B. Caress; William R. Moser; Paul A. Gottlieb

[57] ABSTRACT

A method is provided for forming a synthetic corrosion product layer on tube surfaces. The method utilizes two dissimilar materials with different coefficients of thermal expansion. An object tube and sacrificial tube are positioned one inside the other such that an annular region is created between the two tubes' surfaces. A slurry of synthetic corrosion products is injected into this annular region and the assembly is heat treated. This heat causes the tubes to expand, the inner tube with the higher coefficient of expansion expanding more than the outer tube, thereby creating internal pressures which consolidate the corrosion products and adhere the corrosion products to the tubing surfaces. The sacrificial tube may then be removed by conventional chemical etching or mechanical methods.

25 Claims, 1 Drawing Sheet

METHOD FOR FORMING A LAYER OF SYNTHETIC CORROSION PRODUCTS ON TUBING SURFACES

BACKGROUND OF THE INVENTION

1. Field of the Invention

The present invention relates generally to forming a layer of synthetic corrosion products on tube surfaces, and more particularly to a method for forming a layer of synthetic corrosion products on tube surfaces using an object tube and a sacrificial tube with a different thermal expansion coefficient, the sacrificial tube having been previously shaped into any desired profile.

2. Description of the Prior Art

Corrosion products form during the operation of high temperature and pressure steam systems. These corrosion products accumulate on a steam system's heat exchanger tubing surfaces and affect the heat exchanger's efficiency and performance. In order to refine and improve the heat exchanger's operation, these deposits must be reproduced and tested under controlled conditions.

The corrosion products may be approximated by using a synthetic metal oxide mixture (sludge). This sludge may then be deposited onto a tube surface and the resulting composition used for developing and testing heat exchanger improvements. The tubes used in heat exchangers are generally very small in diameter and, currently, there is no viable method for depositing this sludge onto curved surfaces of such small diameter tubes.

This application deals mainly with adhering a layer of sludge products onto surfaces of small diameter tubes. Currently, there are two general methods for adhering a layer of material onto curved surfaces.

The first method involves introducing coating material into an annular cavity formed between an inner and outer mold. Pressure is then mechanically applied through expansion of one or both of these molds. These molds and expansion mechanisms are relatively bulky and are impractical for use with small diameter tubing used in heat exchangers.

The second method involves pre-forming coating material into tubes and inserting the tube into the object to be coated. The tube is then expanded, forcing the outer surface of the tube against an inner surface of the object to be coated with sufficient pressure to adhere the tube to the object's inner surface. This method is not applicable to heat exchanger tubing because sludge, by its very nature, is initially a slurry and cannot be pre-formed into an expandable insert.

The following U.S. Patents disclose the above methods for depositing a layer of material onto curved surfaces.

U.S. Pat. No. 2,771,655, by Nervi, discloses a method for manufacturing prestressed reinforced concrete piping. A cylindrical mold is placed within a bore of a pre-fabricated reinforced concrete pipe, leaving an annular cavity between an inner surface of the pipe and an outer surface of the mold. Fluid concrete is injected into this annular cavity followed by mechanical movement of the cylindrical mold to exert pressure on the fluid concrete. This pressure is transmitted through the fluid concrete to the pre-fabricated concrete pipe, causing the pipe to expand. This pressure is maintained until the fluid concrete has hardened. The pressure is then released and the pre-fabricated concrete pipe contracts to place the newly formed concrete lining in a state of compression. The resulting product is a pre-fabricated reinforced concrete pipe with a pre-stressed concrete lining.

U.S. Pat. No. 2,724,672, by Rubin, discloses a method for applying a thermoplastic polymer to the interior of pipes and tubes. The thermoplastic polymer is formed into a cylinder slightly smaller in outside diameter than an inside diameter of the pipe or tube. The polymer cylinder is sealed at both ends, with one end admitting a gas tube. Pressurized gas is introduced through this gas tube, causing the cylinder to expand against the pipe or tube with sufficient pressure to adhere the polymer tube's outer surface to the pipe or tube's inner surface. The pressurized gas is released and the ends of the cylinder are unsealed, leaving a pipe or tube with an inner layer of thermoplastic polymer.

U.S. Pat. No. 3,107,158, by Ahlberg, discloses a method for manufacturing pre-stressed concrete pipes. Fluid concrete is injected into an annular cavity formed between a flexible inner mold and a rigid outer mold. Pressure on the fluid concrete is created by injecting water into the inner mold causing the mold to expand. The mold's expansion compresses the fluid concrete against the rigid outer mold and this pressure is maintained until the concrete has hardened. The molds are then removed and the result is a length of pre-stressed concrete pipe.

U.S. Pat. No. 3,382,121, by Sherlock, discloses a method for adhering an expansible polymer insert to an inner surface of a pipe or tube. The expansible insert is composed of a longitudinally oriented polymer which has been previously increased in length and decreased in width by extrusion, forming or cold drawing. This insert is placed within a bore of a pipe or tube and the assembly is heated to a temperature sufficient to release stresses induced by the polymer's orientation. The release of these stresses cause the expansible insert to retract in length and expand in width, thereby forcing the polymer's outer surface against the inner surface of the pipe or tube with sufficient pressure to bind the polymer to the pipe or tube. The result is a pipe or tube with an inner polymer lining.

U.S. Pat. No. 4,743,329, by Hata, discloses a method for manufacturing a plastic pipe with a thin lead lining. A lead pipe with an outer diameter slightly smaller than an inner diameter of a plastic pipe is placed within the bore of the plastic pipe. Both ends of the lead pipe are then sealed leaving only an opening for passage of pressurized gas. This gas is introduced into the lead pipe under sufficient pressure to expand the lead pipe until the lead pipe's outer surface comes into close contact, and adheres to, the plastic pipe's inner surface. The pressurized gas is released and the ends of the lead pipe are unsealed, leaving a plastic pipe with a lead lining.

U.S. Pat. No. 4,368,217, by Tournut, discloses a method for depositing a layer of polytetraflouroethylene (PTFE) onto an object's inner walls. A flexible membrane is placed within the object to be coated, leaving a space between an inner wall of the object and an outer surface of the flexible membrane. This space is filled with PTFE and compressed by deforming the flexible membrane under constant, i.e., isostatic, pressure. The membrane is removed and the object's internal cavity is filled with an incompressible solid substance having fluid flow characteristics and chemical stability at a temperature above PTFE's melting point. The assembly's temperature is raised above PTFE's melting point for a period of time sufficient for the PTFE to lose its crystallinity. The incompressible solid substance is removed leaving an object with an interior PTFE lining.

SUMMARY OF THE INVENTION

It is therefore an object of the present invention to provide a method for depositing a layer of sludge onto a tube's inner curved surface.

It is a further object to provide a method for depositing a layer of sludge onto a tube's outer curved surface.

In all of the above embodiments, it is an object to provide a method for depositing onto a tube's curved surface a layer of sludge having a uniform or variable profile.

According to one broad aspect of the present invention, there is provided a method for depositing a layer of sludge of uniform or variable profile onto objects in shapes other than a tube.

The method comprises the steps of: selecting an object tube and a sacrificial tube, the sacrificial tube having a thermal expansion coefficient which is different from the object tube; placing the object tube and the sacrificial tube so as to be disposed circumjacent, one about the other, and thereby creating an annular region between the object tube and the sacrificial tube; filling the annular region with a sludge slurry; and heating the whole assembly or at least the inner tube so as to expand the inner tube, the inner tube thereby exerting pressure on the sludge slurry and along with heat thereby adhering a layer of synthetic corrosion product from the sludge slurry onto the object tube.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
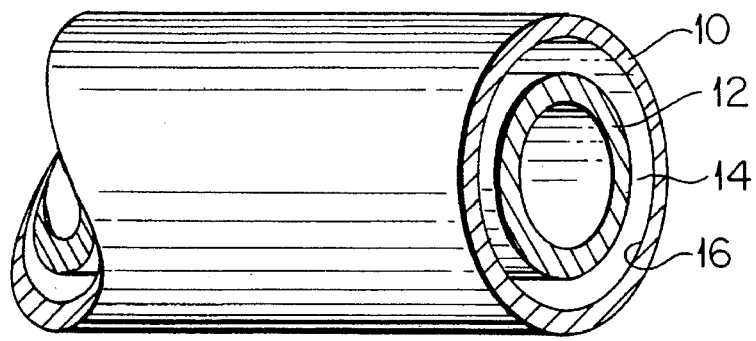
FIG. 1 is a cross-sectional perspective view of an object tube and sacrificial tube for coating interior tubing surfaces, constructed in accordance with a preferred embodiment of the invention.

With reference to the Figures, wherein like reference characters indicate like elements throughout the several views and, in particular, with reference to FIG. 1, an assembly for coating interior tube surfaces is illustrated. The device consists of an object tube 10 and a sacrificial tube 12. The sacrificial tube is constructed of a material with a higher thermal expansion coefficient than the object tube and with an outer surface profile shaped in the mirror image of a desired sludge layer profile. Preferably, the sacrificial tube 12 has a thermal expansion coefficient which is at least about 40% greater than that of object tube 10. Additionally, object tube 10 has an inside diameter (ID) of ½ an inch or less. As may be seen, sacrificial tube 12 is placed inside the object tube's bore such that an annular region 14 is left between the object tube's inner surface and the sacrificial tube's outer surface. To coat the inside surface of the object tube, a sludge slurry 18 is injected into annular region 14 and the assembly is heat treated to harden sludge 18. In a preferred embodiment, temperatures up to about 300° C. were used, sufficient to cause a chemical change in the slurry. Sludge slurry may be comprised of synthetic metal oxides such as $Fe_2O_3$, $Fe_3O_4$, CuO, $Cu_2O$, NiO, MgO, ZnO, PbO, $SnO_2$, $TiO_2$, $SiO_2$, $MnO_2$, $Al_2O_3$, $Cr_2O_3$ and Nickel Ferrite but not limited to the above. The inner sacrificial tube expands during heating and, due to its higher thermal expansion coefficient, creates a necessary binding pressure. This heat and pressure consolidates the sludge and adheres it to the object tube's inner surface 16. Sacrificial tube 12 may then be chemically removed by a conventional chemical etching method leaving a layer of sludge 18 deposited on the tube's inner surface or removed by any other means known in the art.

It should be appreciated that sacrificial tube 12 may be alloys of copper, nickel, molybdenum, zirconium, titanium, iron or any other material having a thermal expansion coefficient which is greater than about 40% of the object tube 10. In this embodiment the object tube was made of Inconel™, but any metal with a coefficient of thermal expansion which differs from the sacrificial tube by about 40% can be used.

Figure 2:
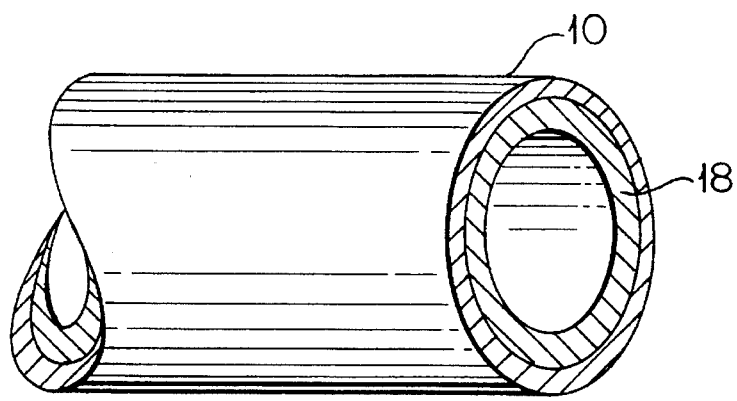
FIG. 2 illustrates a cross-sectional perspective view of a coated object tube constructed in accordance with the preferred embodiment of the invention as illustrated in FIG. 1.

FIG. 2 shows the sludge deposited on the inside of the object tube 10 with the inner sacrificial tube removed.

Figure 3:
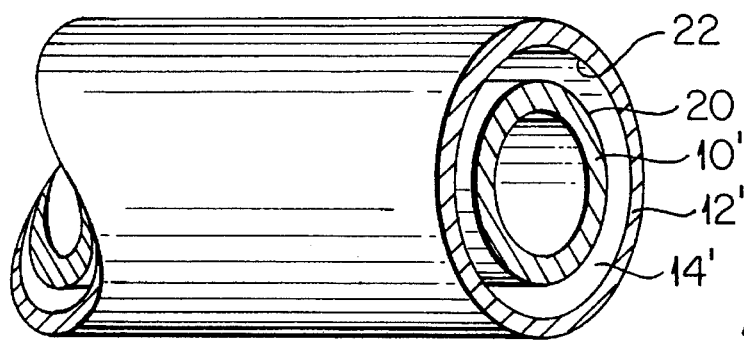
FIG. 3 is a cross-sectional perspective view of an object tube and sacrificial tube for coating exterior tubing surfaces, constructed in accordance with an alternate embodiment of the invention.
Figure 4:
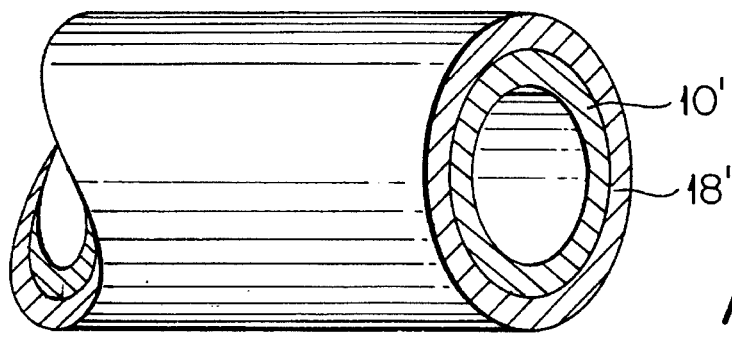
FIG. 4 illustrates a cross-sectional perspective view of a coated object tube constructed in accordance with the alternative embodiment of the invention as illustrated in FIG. 3.

Turning to FIG. 3, an alternate embodiment which allows an exterior curved surface to be coated with sludge 18' is illustrated. For clarity, like elements have been provided with like reference numerals except that a prime has been added to each reference numerals. The following discussion will focus on the differences between elements of this embodiment and that of the preferred embodiment.

The primary difference in this embodiment is that the object tube 10' is placed inside sacrificial tube's 12' bore such that an annular region 14' is left between the object tube's outer surface 20 and sacrificial tube's inner surface 22. A sludge slurry 18' is injected into annular region 14' between tubes 10', 12' and the assembly is heat treated to harden sludge 18'. The inner object tube expands during heating and, due to its higher thermal expansion coefficient, creates a necessary binding pressure. The heat and pressure consolidates sludge 18' and adheres it to object tube's outer surface 20. The sacrificial tube may then be chemically removed with a conventional etching method or mechanically removed leaving a layer of sludge 18' deposited on the object tube's outer surface 20.

It should be appreciated that sacrificial tube 12' may be alloys of copper, nickel, molybdenum, zirconium, titanium, iron or any other material having a thermal expansion coefficient which is less than about 40% of the inner object tube 10'.

Although in the preferred embodiments the difference in thermal expansion coefficients between the object tube and the sacrificial tube was about 40%, and the temperature used was about 300° C., it should be appreciated that different coatings may require either more or less heat and pressure to consolidate the sludge coatings. Therefore, the result is an increased or decreased required thermal expansion coefficient differential between the object tube and the sacrificial tube.

It should be appreciated that the inventive concept of using differential thermal expansion coefficients of materials to generate the pressure required to bind sludge 18 and to create an adherent layer may also be applicable to deposit sludge 18 on geometrical surfaces other than object tubing 10, e.g., crevices between tubes and tube support plates, channels, plates, etc. The concept may also be used for depositing layers of material other than sludge, e.g., powdered metals, chemicals, etc.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention or defined by the appended claims, unless they depart therefrom.

What is claimed is:

1. A method for forming a layer of synthetic corrosion products on tubing surfaces, said method comprising the steps of:

selecting an object tube and a sacrificial tube, said sacrificial tube having a thermal expansion coefficient which is not equal to a thermal expansion coefficient of said object tube;

placing said object tube and said sacrificial tube so as to be disposed circumjacent, one inside the other, and thereby creating an annular region between said object tube and said sacrificial tube; filling said annular region with a sludge slurry; and heating at least said inside tube so as to expand said inside tube, said inside tube thereby exerting pressure on said sludge slurry and thereby adhering a layer of synthetic corrosion product from said sludge slurry onto said object tube.

2. The method recited in claim 1 wherein said object tube encloses said sacrificial tube, thereby having said annular region within said object tube and in communication with an inner surface of said object tube.

3. The method recited in claim 1 wherein said sacrificial tube encloses said object tube, thereby having said annular region outside of said object tube and in communication with an outer surface of said object tube.

4. The method recited in claim 1 wherein said sludge slurry is a synthetic metal oxide.

5. The method recited in claim 4, wherein said synthetic metal oxide is selected from the group consisting of $Fe_2O_3$, $Fe_3O_4$, CuO, $Cu_2O$, NiO, MgO, ZnO, PbO, $SnO_2$, $TiO_2$, $SiO_2$, $MnO_2$, $Al_2O_3$, $Cr_2O_3$ and Nickel Ferrite.

6. The method recited in claim 1 wherein said sacrificial tube is constructed from material selected from the group consisting of alloys of copper, nickel, molybdenum, zirconium, titanium, and iron.

7. The method recited in claim 2 wherein said sacrificial tube has a thermal expansion coefficient which is greater than about 40% of said object tube.

8. The method recited in claim 1 wherein said sacrificial tube has a thermal expansion coefficient which is less than about 40% of said object tube.

9. The method recited in claim 3, further comprising the step of removing said sacrificial tube after said synthetic corrosion product has been deposited.

10. The method recited in claim 9 wherein said removing step is accomplished by chemical etching.

11. The method recited in claim 9 wherein said removing step is accomplished by mechanical removal.

12. The method recited in claim 1 wherein said heating is sufficient to generate chemical changes in said slurry.

13. A method for forming a layer of synthetic corrosion products on tubing surfaces, said method comprising the steps of:

selecting an object tube and a sacrificial tube, said sacrificial tube having a thermal expansion coefficient which is greater than said object tube;

placing said object tube and said sacrificial tube so as to be disposed circumjacent, one about the other, and thereby creating an annular region between said object tube and said sacrificial tube, said object tube enclosing said sacrificial tube, thereby having said annular region within said object tube and in communication with an inner surface of said object tube;

filling said annular region with a sludge slurry; and heating at least said sacrificial tube so as to expand said sacrificial tube, said sacrificial tube thereby exerting pressure on said sludge slurry and thereby adhering a synthetic corrosion product from said sludge slurry onto said object tube.

14. The method recited in claim 13 wherein said sludge slurry is a synthetic metal oxide.

15. The method recited in claim 14, wherein said synthetic metal oxide is selected from the group consisting of $Fe_2O_3$, $Fe_3O_4$, CuO, $Cu_2O$, NiO, MgO, ZnO, PbO, $SnO_2$, $TiO_2$, $SiO_2$, $MnO_2$, $Al_2O_3$, $Cr_2O_3$ and Nickel Ferrite.

16. The method recited in claim 13 wherein said sacrificial tube is constructed from material selected from the group consisting of alloys of copper, nickel, molybdenum, zirconium, titanium, and iron.

17. The method recited in claim 13 wherein said sacrificial tube has a thermal expansion coefficient which is greater than about 40% of said object tube.

18. The method recited in claim 13, further comprising the step of removing said sacrificial tube after said synthetic corrosion product has been deposited.

19. The method recited in claim 18 wherein said removing step is accomplished by chemical etching.

20. The method recited in claim 13 wherein said heating is sufficient to generate chemical changes in said slurry.

21. A method for forming a layer of synthetic corrosion products on tubing surfaces, said method comprising the steps of:

selecting an object tube and a sacrificial tube, said sacrificial tube having a thermal expansion coefficient which is less than said object tube;

placing said object tube and said sacrificial tube so as to be disposed circumjacent, one about the other, and thereby creating an annular region between said object tube and said sacrificial tube, said sacrificial tube enclosing said object tube, thereby having said annular region outside of said object tube and in communication with an outer surface of said object tube;

filling said annular region with a sludge slurry; and heating at least said object tube so as to expand said object tube, said object tube thereby exerting pressure on said sludge slurry and thereby adhering a synthetic corrosion product from said sludge slurry on said object tube.

22. The method recited in claim 21 wherein said sludge slurry is a synthetic metal oxide.

23. The method recited in claim 21 wherein said sacrificial tube has a thermal expansion coefficient which is less than about 40% of said object tube.

24. The method recited in claim 21, further comprising the step of removing said sacrificial tube, after said synthetic corrosion product has been deposited, by chemical etching.

25. The method recited in claim 21, further comprising the step of removing said sacrificial tube, after said synthetic corrosion product has been deposited, by mechanical methods.

* * * * *